Patented Mar. 24, 1953

2,632,768

UNITED STATES PATENT OFFICE 2,632,768

POLY-ALKENYL PHOSPHONATE ESTERS

Harry W. Coover, Jr., and Joseph B. Dickey, Kingsport, Tenn., assignors to Eastman Kodak Company, Rochester, N. Y., a corporation of New Jersey No Drawing. Application November 4, 1950, Serial No. 194,186

3 Claims. (Cl. 260—461)

This invention relates to poly-alkenyl phosphonic acid esters and to the preparation of those esters by reacting two moles of a dialkyl alkenyl phosphonate with one mole of thionyl chloride. This invention also relates to the use of those esters as insecticides and rodenticides.

Simple phosphonate esters have been previously prepared as shown, for instance, in U. S. Patents Nos. 2,397,422 and 2,400,577 and in Beilstein, vol. IV, pages 595 and 596. Ordinarily, phosphonates are prepared by reacting triethylphosphite or some similar ester with an organic halide such as methyliodide or propylbromide. Nowhere in the prior art, however, has there been any description of the preparation of polyphosphonates having unsaturated groups therein nor any recognition that those compounds are useful for insecticidal purposes.

One object of our invention is to provide polyphosphonates having unsaturated groups therein. Another object of our invention is to provide a process by which those polyphosphonates may be prepared using thionyl chloride in their preparation. A further object of our invention is to provide new phosphorus-containing compounds having insecticidal properties. Other objects of our invention will appear herein.

We have found that polyphosphonates having unsaturated groups therein can be prepared by the reaction of dialkyl alkenyl phosphonates with thionyl chloride using approximately two moles of the former to one of the latter. This reaction may be carried out by placing a mixture of the two reactants in a reaction vessel and subjecting to an elevated temperature such as 80–120° C. It is desirable that the reaction vessel be equipped with a short column, a condenser, and a receiver and that the heating be at such a temperature that the alkyl chloride formed distills from the reaction mixture as rapidly as it is formed. In those cases, however, where the alkyl chloride formed boils above the boiling point of the thionyl chloride, the alkyl chloride would then be removed by distillation after the reaction has been completed.

The reaction in accordance with our invention goes in accordance with the following equation:

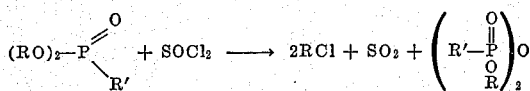

where R' is a propene or butene group and R is a lower alkyl as methyl, ethyl, propyl, or butyl.

The products which are obtained in accordance with the process of my invention are colorless or light yellow, viscous oils. These products after removing the alkyl chloride and SO₂ therefrom by distillation are of satisfactory purity for most applications.

Ordinarily it is desirable to employ the reactants in the molar proportions in which they take part in the reaction illustrated although this may be varied to some extent. It is preferable to use approximately two moles of the phosphonate with each mole of the thionyl chloride for most economical operation.

The following examples illustrate my invention:

Example 1

17.8 parts of diethyl propene-2-phosphonate and 5.9 parts of thionyl chloride were placed in a reaction vessel wherein they were heated at a temperature of approximately 100° C. until no further evolution of ethyl chloride or sulphur dioxide occurred. The unreacted starting material and the low boiling materials were removed by distillation leaving a light yellow oil which was diethyl propene-2-pyrophosphonate.

Example 2

17.8 parts of diethyl isopropenephosphonate and 5.9 parts of thionyl chloride were mixed together in a reaction vessel and heated on a steam bath until the evolution of ethyl chloride and sulphur dioxide ceased. The lower boiling material present was distilled off leaving diethyl isopropenepyrophosphonate having the following formula:

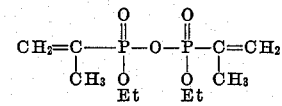

Example 3

5.9 parts of thionyl chloride were gradually added with stirring to 15 parts of dimethyl-2-propenephosphonate while heating at 100° C. The theoretical amount of ethyl chloride was obtained in about two hours. The final product was a clear, viscous oil and contained 24.2% phosphorus. The product obtained had the following formula:

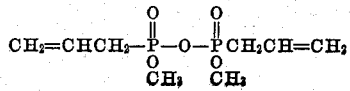

Example 4

5.9 parts of thionyl chloride were gradually added with stirring to 19 parts of diethyl-2-methyl-2-propenephosphonate while heating at 120° C. The theoretical amount of ethyl chloride was obtained in about two hours. The final product was a light yellow, viscous oil which product was found by analysis to contain 19.1% phosphorus.

Example 5

6 parts of thionyl chloride was gradually added with stirring to 23 parts of dibutyl-1-propenephosphonate while heating at 100° C. The final product was a light yellow, viscous oil having good insecticidal properties. Upon analysis, it was found to contain 18.1% of phosphorus.

Example 6

6 parts of thionyl chloride and 16 parts of diethyl vinyl phosphonate were mixed together and heated on a steam bath in a reaction flask equipped with a condenser and receiver for a period of two hours. The diethyldivinylpyrophosphonate obtained was a light yellow oil containing 24.1% of phosphorus by analysis.

We claim:

1. The compound represented by the formula:

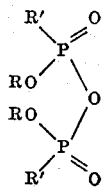

R being a lower alkyl group and R' being an alkenyl group.

2. The compound represented by the formula:

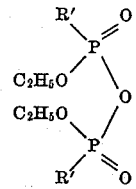

R' being an alkenyl group.

3. The compound represented by the formula:

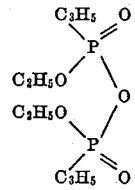

HARRY W. COOVER, JR.
JOSEPH B. DICKEY.

REFERENCES CITED

The following references are of record in the file of this patent:

UNITED STATES PATENTS

| Number | Name | Date |
|---|---|---|
| 2,566,194 | Hagemeyer et al. | Aug. 28, 1951 |

OTHER REFERENCES

Hatt, J. Chem. Soc. (1933), pages 776–786.